US011043001B2

(12) United States Patent
Zhang et al.

(10) Patent No.: US 11,043,001 B2
(45) Date of Patent: Jun. 22, 2021

(54) HIGH PRECISION OBJECT LOCATION IN A PARKING LOT

(71) Applicant: Black Sesame International Holding Limited, Santa Clara, CA (US)

(72) Inventors: Tao Zhang, Shanghai (CN); Weihong Liu, Shanghai (CN)

(73) Assignee: Black Sesame International Holding Limited, San Jose, CA (US)

(*) Notice: Subject to any disclaimer, the term of this patent is extended or adjusted under 35 U.S.C. 154(b) by 0 days.

(21) Appl. No.: 16/245,204

(22) Filed: Jan. 10, 2019

(65) Prior Publication Data

US 2020/0226778 A1    Jul. 16, 2020

(51) Int. Cl.
| | |
|---|---|
| *G06T 7/70* | (2017.01) |
| *G06T 7/593* | (2017.01) |
| *G06K 9/62* | (2006.01) |
| *G06T 7/60* | (2017.01) |
| *H04N 13/204* | (2018.01) |
| *H04N 5/247* | (2006.01) |

(52) U.S. Cl.
CPC .............. *G06T 7/70* (2017.01); *G06K 9/6202* (2013.01); *G06T 7/593* (2017.01); *G06T 7/60* (2013.01); *H04N 13/204* (2018.05); *G06K 2209/23* (2013.01); *G06T 2207/10012* (2013.01); *G06T 2207/10021* (2013.01); *G06T 2207/10028* (2013.01); *G06T 2207/30264* (2013.01); *H04N 5/247* (2013.01)

(58) Field of Classification Search
CPC .. G06T 7/70; G06T 7/593; G06T 7/60; G06T 2207/10012; G06T 2207/10021; G06T 2207/10028; G06T 2207/30264; H04N 13/204; H04N 5/247; G06K 9/6202; G06K 2209/23
USPC .......................................................... 348/46
See application file for complete search history.

(56) References Cited

U.S. PATENT DOCUMENTS

| | | | |
|---|---|---|---|
| 2008/0101656 A1* | 5/2008 | Barnes .................... | G08G 1/017 382/104 |
| 2013/0182114 A1* | 7/2013 | Zhang ...................... | H04N 7/18 348/150 |

FOREIGN PATENT DOCUMENTS

| | | | | |
|---|---|---|---|---|
| CN | 103162639 A | * | 6/2013 | |
| CN | 108132025 A | * | 6/2018 | |
| WO | WO-2016138161 A1 | * | 9/2016 | ........... G06T 19/006 |

* cited by examiner

*Primary Examiner* — Thai Q Tran
*Assistant Examiner* — Nienru Yang
(74) *Attorney, Agent, or Firm* — Timothy T. Wang; Ni, Wang & Massand, PLLC

(57) ABSTRACT

A method of high precision object location in a parking lot including capturing via an entry stereo camera a template image and an entry video of a vehicle entering a parking lot, measuring a distance versus time of the vehicle entering the parking lot based on the entry video, line scanning via at least one LIDAR an outline versus time of the vehicle entering the parking lot, constructing a scanned image based on the measured distance versus time and the outline versus time and forming a three dimensional construct of the vehicle based on the template image and the scanned image.

16 Claims, 10 Drawing Sheets

HIGH PRECISION OBJECT LOCATION IN A PARKING LOT

BACKGROUND

Technical Field

The instant disclosure is related to precise location detection and more particularly to the precise location detection of a vehicle within a parking lot.

Background

Vehicle localization is very useful in autonomous driving. One method of location detection is by global positioning system (GPS). Standard GPS localization precision is approximately 5 m and the precision degrades and/or fails in the event that the GPS signals are blocked. Another type of GPS called Differential GPS may locate an object to as little as 1 cm. However, it is expensive and it also suffers from degradation or failure due to signal blockage.

Simultaneous location and mapping (SLAM) utilizes vision from the vehicle. A high resolution map is built and cameras capture images of the environment. By comparing the images with high resolution map, the location of the vehicle may be determined. The precision may be as little as 20 cm. However, it requires the mounting of cameras on the vehicle.

SUMMARY

In one embodiment, a method of high precision object location in a parking lot including capturing via an entry stereo camera a template image and an entry video of a vehicle entering a parking lot, measuring a distance versus time of the vehicle entering the parking lot based on the entry video, line scanning via at least one LIAR an outline versus time of the vehicle entering the parking lot, constructing a scanned image based on the measured distance versus time and the outline versus time and forming a three dimensional construct of the vehicle based on the template image and the scanned image.

The method may further include capturing a parkway image of the vehicle with at least one parkway camera, matching the parkway image to the template image, determining an angle of the vehicle in the parkway image related to the template image, determining a scale of the vehicle in the parkway image related to the template image, determining a transformation matrix based on the angle of the vehicle and the scale of the vehicle and determining a position of the vehicle based on the transformation matrix and the three dimensional construct of the vehicle.

In another embodiment, a system of high precision object location in a parking lot, including an entry stereo camera that captures a template image and an entry video of a vehicle entering a parking lot, at least one LIDAR line that scans an outline versus time of the vehicle entering the parking lot, a non-transitory computer readable medium comprising instructions that, when read by a processor, cause the processor to; measure a distance versus time of the vehicle entering the parking lot based on the entry video, construct a scanned image based on the measured distance versus time and the outline versus time and form a three dimensional construct of the vehicle based on the template image and the scanned image.

The system may further include at least one parkway camera that captures a parkway image of the vehicle, the non-transitory computer readable medium comprising instructions that, when read by the processor, cause the processor to further; match the parkway image to the template image, determine an angle of the vehicle related to the template image, determine a scale of the vehicle related to the template image, determine a transformation matrix based on the angle of the vehicle and the scale of the vehicle and determine a position of the vehicle based on the transformation matrix and the three dimensional construct of the vehicle.

DETAILED DESCRIPTION OF THE INVENTION

The embodiments listed below are written only to illustrate the applications of this apparatus and method, not to limit the scope. The equivalent form of modifications towards this apparatus and method shall be categorized as within the scope the claims.

Certain terms are used throughout the following description and claims to refer to particular system components. As one skilled in the art will appreciate, different companies may refer to a component and/or method by different names. This document does not intend to distinguish between components and/or methods that differ in name but not in function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device that connection may be through a direct connection or through an indirect connection via other devices and connections.

Figure 1:
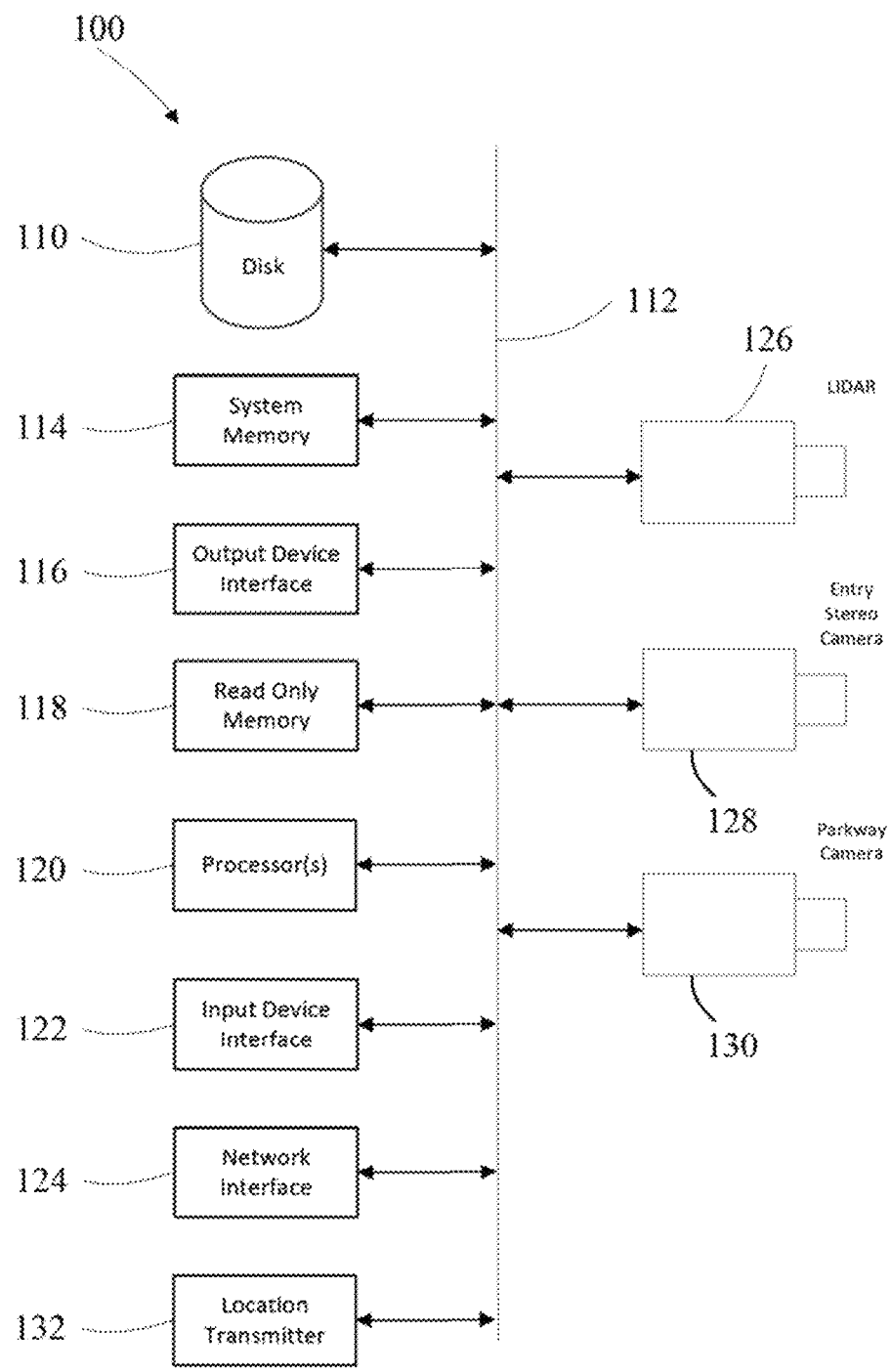
FIG. 1 is a system diagram in accordance with one embodiment of the disclosure.

FIG. 1 depicts an example electronic system for use in connection with a system having three image capture devices. Electronic system 100 may be a computing device for execution of software associated with the operation of one or more portions or steps of process 400, or components and processes provided by FIG. 4. Electronic system 100 may be an embedded computer, personal computer or a mobile device such as a tablet computer, laptop, smart phone, PDA, or other touch screen or television with one or more processors embedded therein or coupled thereto, or any other sort of computer-related electronic device.

Electronic system 100 may include various types of computer readable media and interfaces for various other types of computer readable media. In the depicted example, electronic system 100 includes a bus 112, processor(s) 120, a system memory 114, a read-only memory (ROM) 118, a permanent storage device 110, an input device interface 122, an output device interface 116, and one or more network interfaces 124. In some implementations, electronic system 100 may include or be integrated with other computing devices or circuitry for operation of the various components and processes previously described. In one embodiment of the present disclosure the processor(s) 120 is coupled through the bus 112 to a light imaging and ranging device (LIDAR) 126, an entry stereo camera 128 and a parkway camera 130. Additionally, a location transmitter 132 is connected to bus 112 and provides feedback to the vehicle of its location within the parking lot.

Bus 112 collectively represents all system, peripheral, and chipset buses that communicatively connect the numerous internal devices of electronic system 100. For instance, bus 112 communicatively connects processor(s) 120 with ROM 118, system memory 114, permanent storage device 110, LIDAR 126, entry stereo camera 128 and parkway camera 130.

From these various memory units, processor(s) 120 retrieves instructions to execute and data to process in order to execute the processes of the subject disclosure. The processing unit(s) can be a single processor or a multi-core processor in different implementations.

ROM 118 stores static data and instructions that are needed by processor(s) 120 and other modules of the electronic system. Permanent storage device 110, on the other hand, is a read-and-write memory device. This device is a non-volatile memory unit that stores instructions and data even when electronic system 100 is off. Some implementations of the subject disclosure use a mass-storage device (such as a magnetic or optical disk and its corresponding disk drive) as permanent storage device 110.

Other implementations use a removable storage device (such as a floppy disk, flash drive, and its corresponding disk drive) as permanent storage device 110. Like permanent storage device 110, system memory 114 is a read-and-write memory device. However, unlike permanent storage device 110, system memory 114 is a volatile read-and-write memory, such a random access memory. System memory 114 stores some of the instructions and data that the processor needs at runtime. In some implementations, the processes of the subject disclosure are stored in system memory 114, permanent storage device 110, and/or ROM 118. From these various memory units, processor(s) 120 retrieves instructions to execute and data to process in order to execute the processes of some implementations.

Bus 112 also connects to input and output device interfaces 122 and 116. Input device interface 122 enables the user to communicate information and select commands to the electronic system. Input devices used with input device interface 122 include, for example, alphanumeric keyboards and pointing devices (also called "cursor control devices"). Output device interfaces 116 enables, for example, the display of images generated by the electronic system 100. Output devices used with output device interface 116 include, for example, printers and display devices, such as cathode ray tubes (CRT) or liquid crystal displays (LCD). Some implementations include devices such as a touchscreen that functions as both input and output devices.

Finally, as shown in FIG. 1, bus 112 may also couple electronic system 100 to a network (not shown) through network interfaces 124. Network interfaces 124 may include, for example, a wireless access point (e.g., Bluetooth or WiFi) or radio circuitry for connecting to a wireless access point. Network interfaces 124 may also include hardware (e.g., Ethernet hardware) for connecting the computer to a part of a network of computers such as a local area network ("LAN"), a wide area network ("WAN"), wireless LAN, or an Intranet, or a network of networks, such as the Internet. Any or all components of electronic system 100 can be used in conjunction with the subject disclosure.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. Data generated at the client device (e.g., a result of the user interaction) can be received from the client device at the server.

Figure 2:
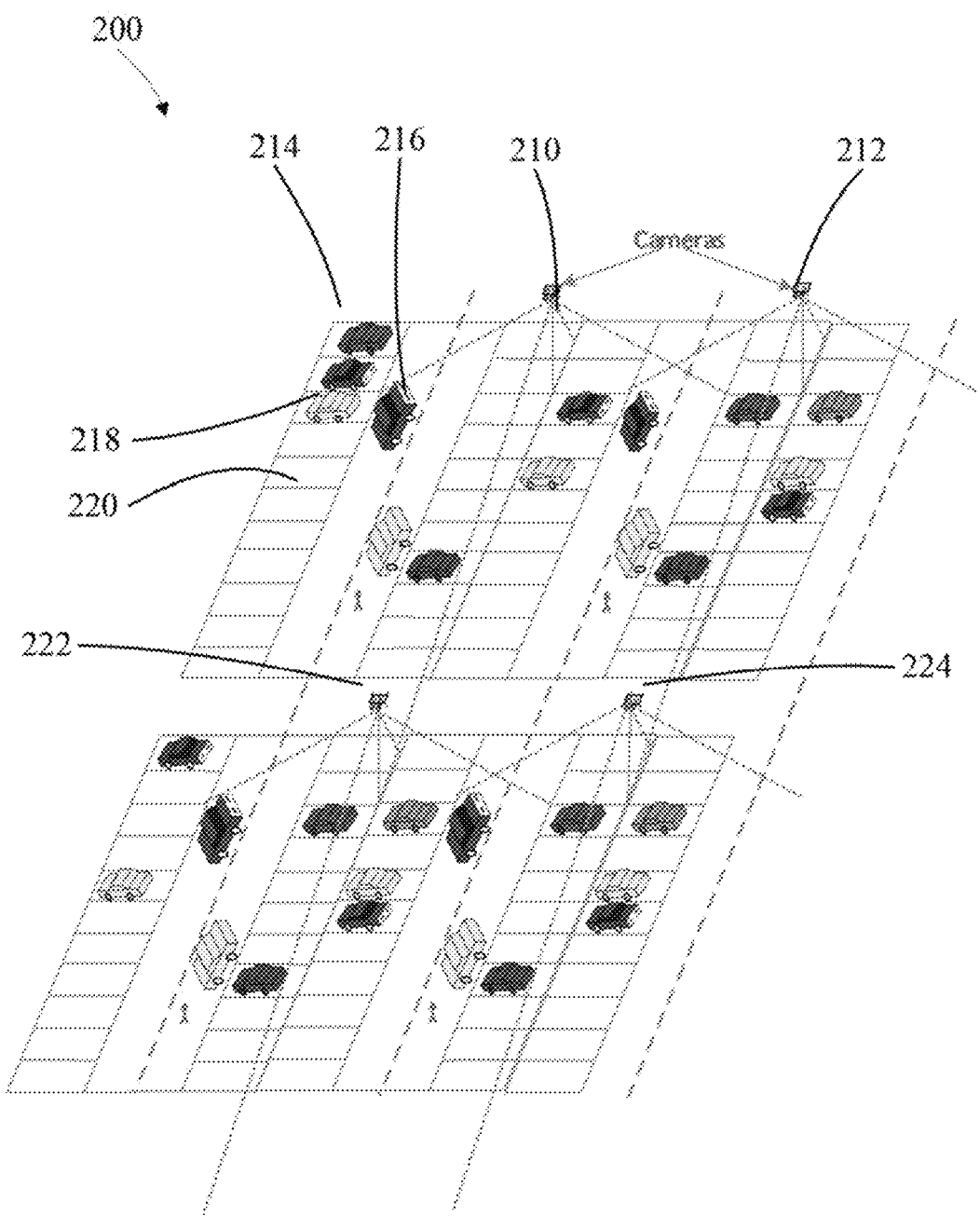
FIG. 2 is a layout overview showing a four image capture device layout in accordance with one embodiment of the disclosure.

FIG. 2 depicts parkway cameras in a parking lot with the cameras side-by-side 210, 212 and forming an array 210, 212, 222, 224. The pictures of parkway cameras overlap to cover the parking lot. The figure is a bird's eye view of the four parkway cameras.

In the embodiment of FIG. 2 at least one parkway camera captures a parkway image of the vehicle and a processor matches the parkway image to the template image, determines an angle of the vehicle related to the template image and determines a scale of the vehicle related to the template image. At this point the system determines a transformation matrix based on the angle of the vehicle and the scale of the vehicle and determines a position of the vehicle based on the transformation matrix and the three dimensional construct of the vehicle.

Figure 3:
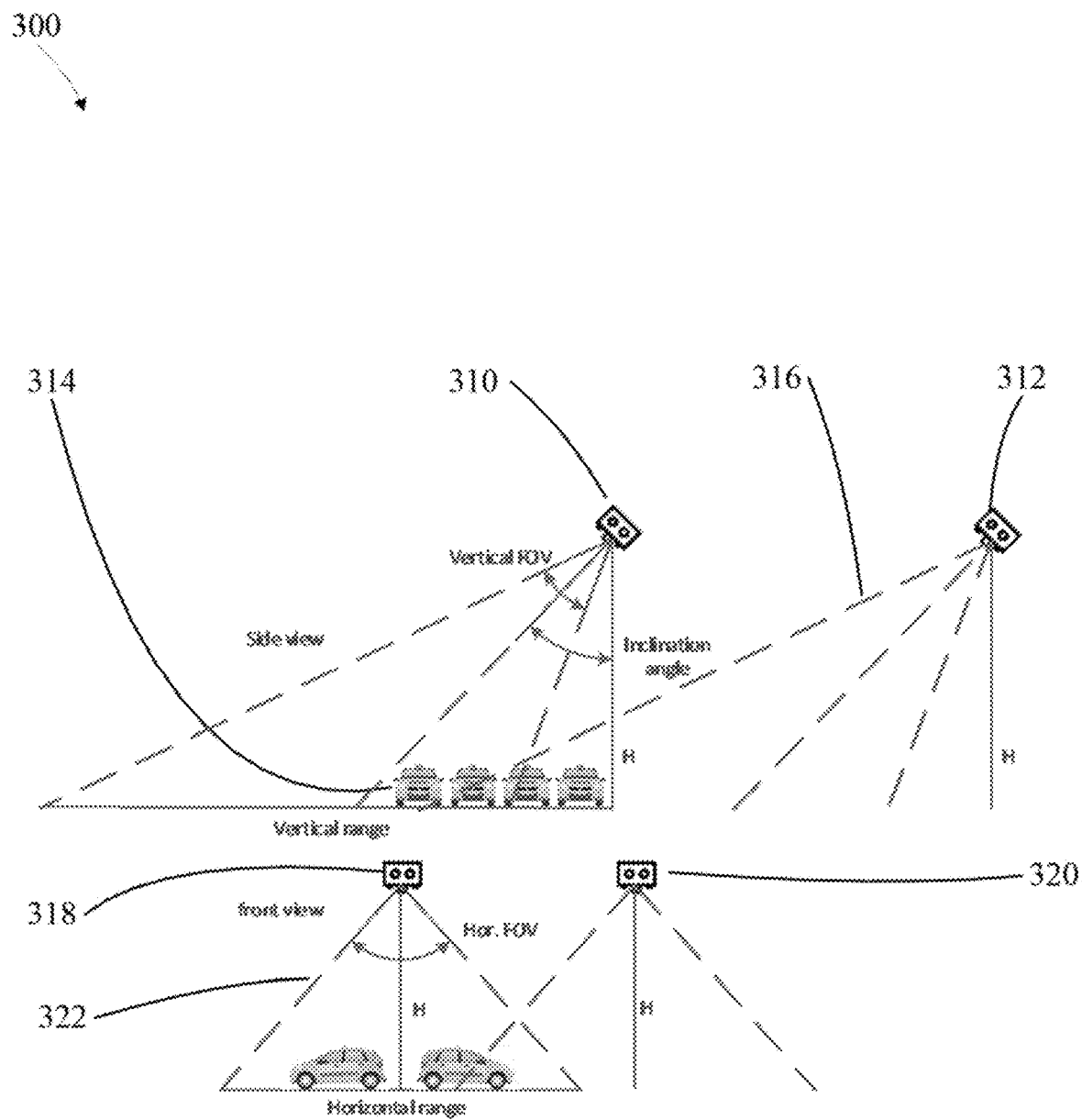
FIG. 3 depicts a side view showing image capture device capture angles in accordance with one embodiment of the disclosure.

FIG. 3 depicts a geometric relationship between two image capture devices within the image capture device array. Image capture devices 310 and 312 being situation side by side and having a vertical field of view (FOV), inclination angle and overlap and image capture devices 318 and 320 also in a side by side relationship showing an horizontal field of view and overlap.

Cameras may be installed in the parking lot in a side by side configuration. The images received by the cameras have a region of overlap to cover the entire driving area. An example parkway camera deployment is illustrated in FIGS. 2 and 3. FIG. 2 is bird's eye view of the camera setup in the parking lot having four cameras. FIG. 3 is a detailed view demonstrating the relationship of two of the parkway cameras. The parkway cameras may be stereo or mono.

Figure 4:
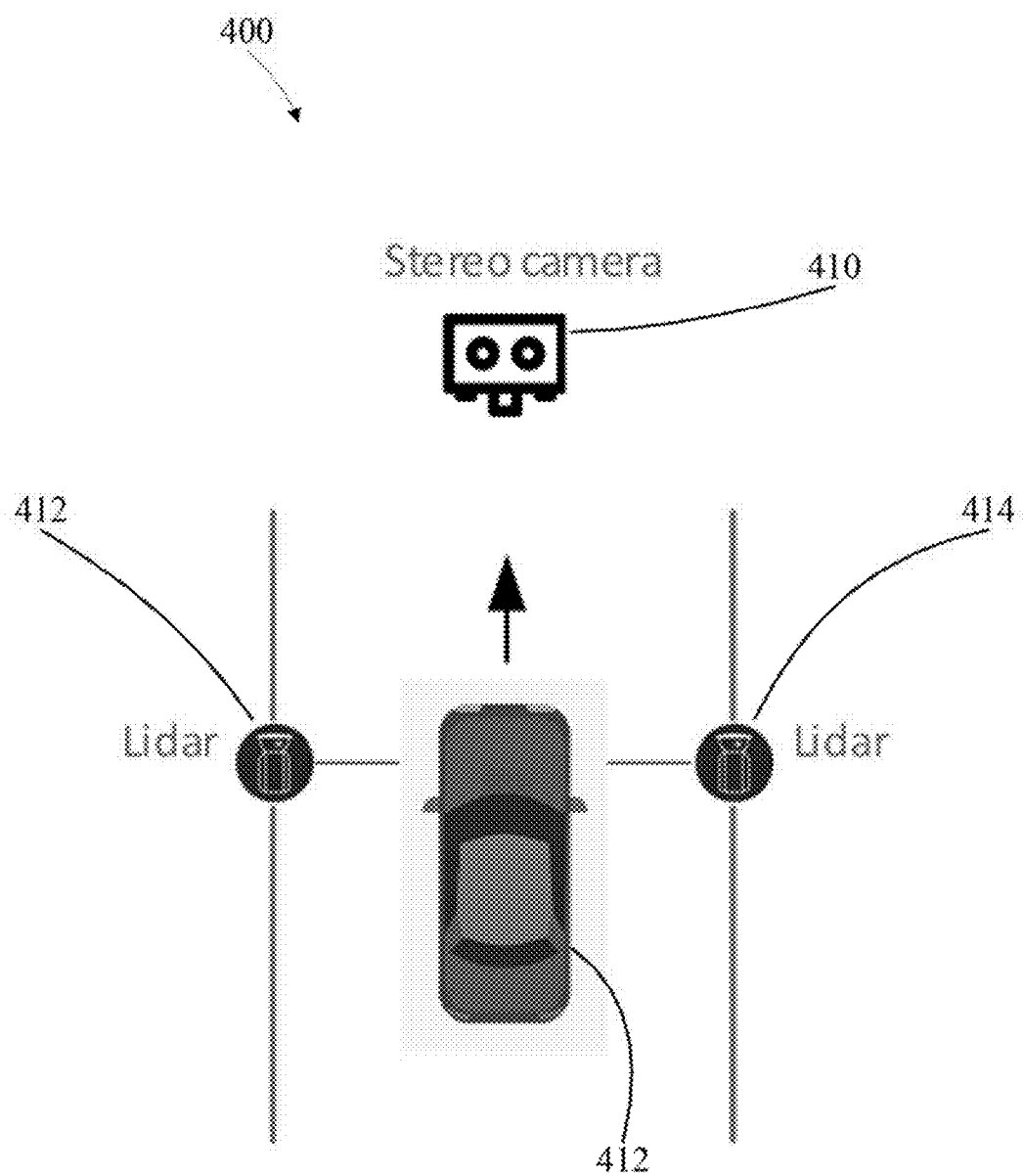
FIG. 4 depicts a top view of a vehicle entering a parking lot and being sensed by two LIDARs and a stereo camera in accordance with one embodiment of the disclosure.

FIG. 4 gives an example implementation of the image capture and scanning of the vehicle. In this example a stereo camera 41 and two single line scan LIDARs 412, 414 are utilized. The two line-scan LIDARS scan the vehicle 412 as it passes through the entrance. The stereo camera 410 measures the distance of the vehicle continuously the vehicle speed may be calculated. Having a vehicle speed and LIDAR scans of both sides of the vehicle, the vehicle 3D structure can be precisely constructed. The 3D structure may is matched with the image captured from the stereo camera.

As a vehicle enters the parking lot, an entry stereo camera captures a template image and an entry video of the vehicle. At least one LIDAR line scans an outline versus time of the vehicle entering the parking lot. A processor receives the entry stereo camera video and measures a distance versus time of the vehicle entering the parking lot. The processor receives the LIDAR line scans and constructs a scanned image based on the measured distance versus time from the entry stereo camera and the outline versus time from the LIDAR and forms a three dimensional construct of the vehicle based on the template image and the scanned image. The LIDARs may be positioned to a right side and a left side of a vehicle path of travel as the vehicle enters the parking lot.

Figure 5:
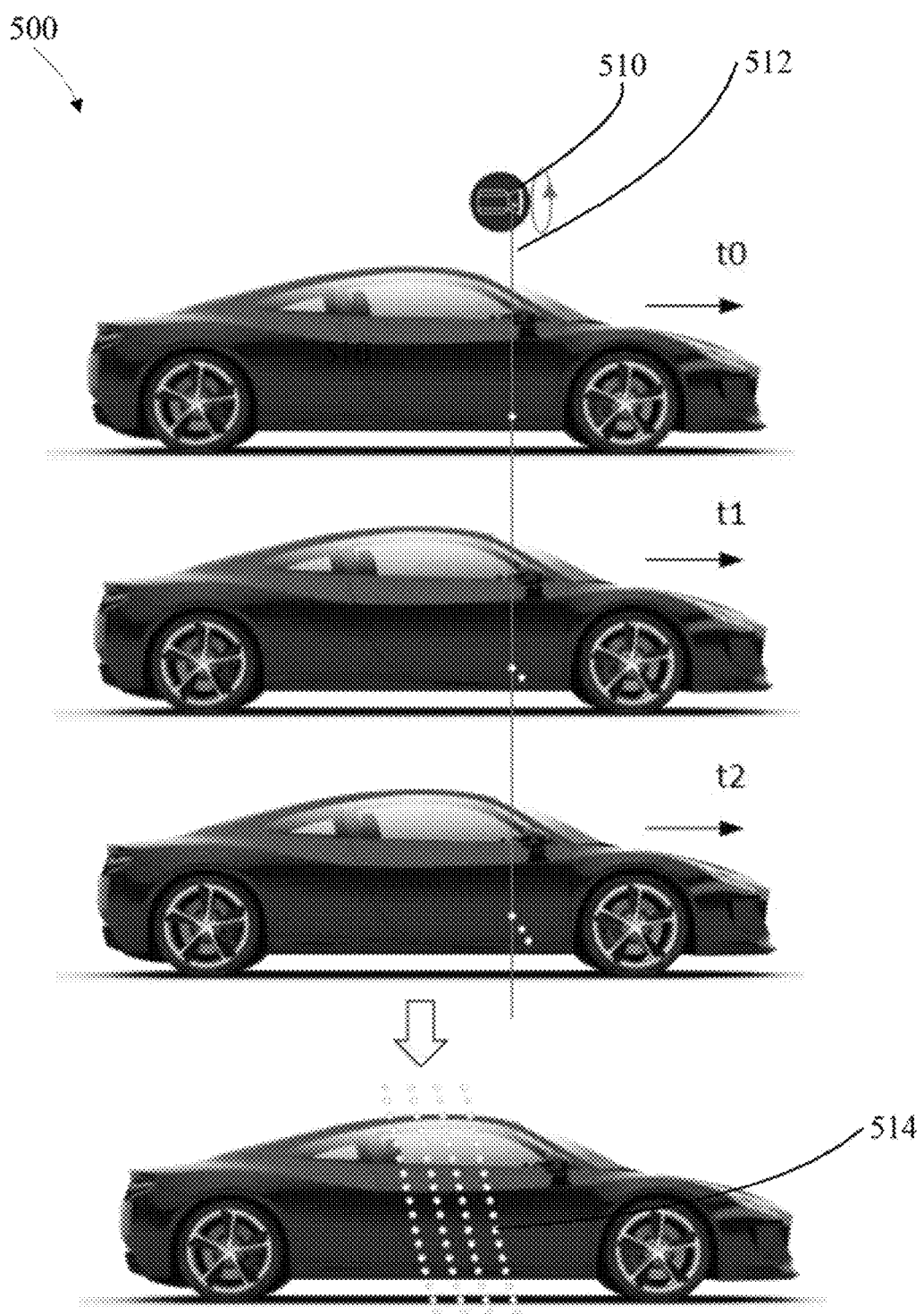
FIG. 5 depicts a side view showing LIDAR sensing of one side of a vehicle in accordance with one embodiment of the disclosure.

FIG. 5 shows a 3D construction process utilizing LIDAR 510 at one side of a vehicle. At time t0, the line-scan laser beam 512 measures the distance to the white point on laser line in picture t0. As vehicle moves, at time t1, laser measures the distance to the white point on laser line in picture t1. Because the vehicle speed V is measured by the entry stereo camera, the horizontal distance between each laser measure point can be calculated by (tn+1−tn)*V. The vertical distance can also be determined by the LIDAR. In this way, x, y, z coordinates of each laser point may be determined 514 and a 3D structure of this side of the vehicle may be modeled. Also, the other side may be scanned and then the whole 3D structure of the vehicle can be constructed.

Figure 6:
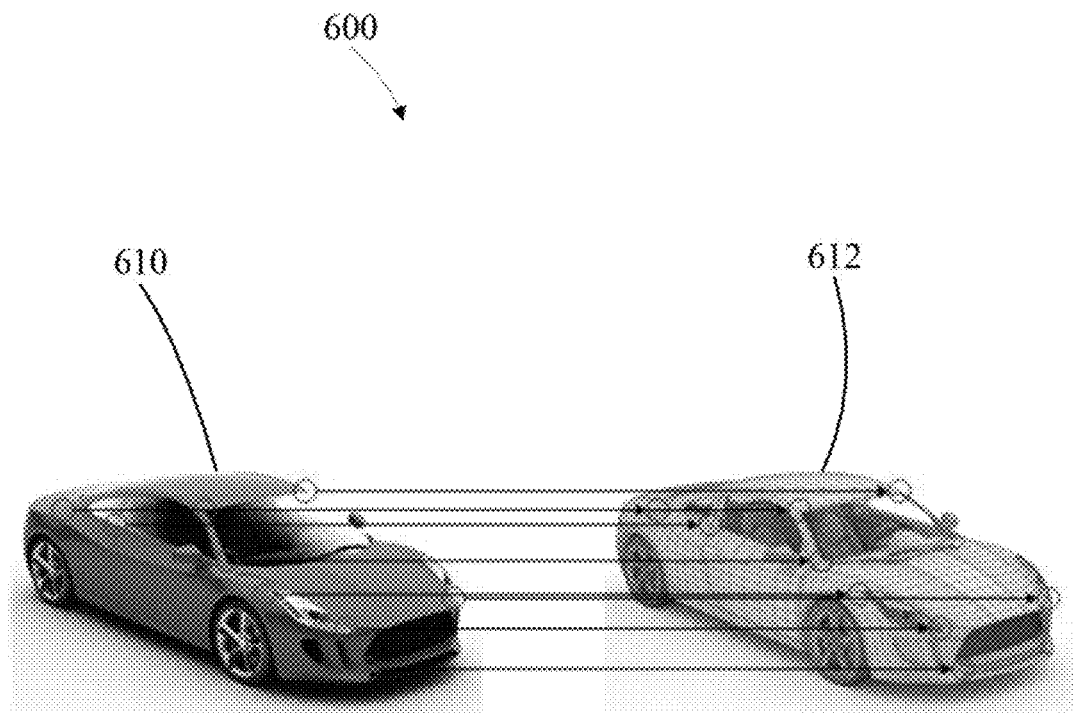
FIG. 6 depicts an image to model conversion in accordance with one embodiment of the disclosure.

FIG. 6 depicts an example of mapping between the template image 612 and 3D structure 610.

A monocular or stereo camera may be utilized in the parking lot to capture an image of the vehicle. The image will be matched with template image to get the angles and scale related to template image. The angles and scale will be used to calculate the vehicle distance from current camera. The exact position of the vehicle may be determined by combining the angles, scale distance and vehicle 3D structure. Because template image and 3D structure may be generated in high precision, vehicle position can be precisely determined utilizing a common camera.

Figure 7:
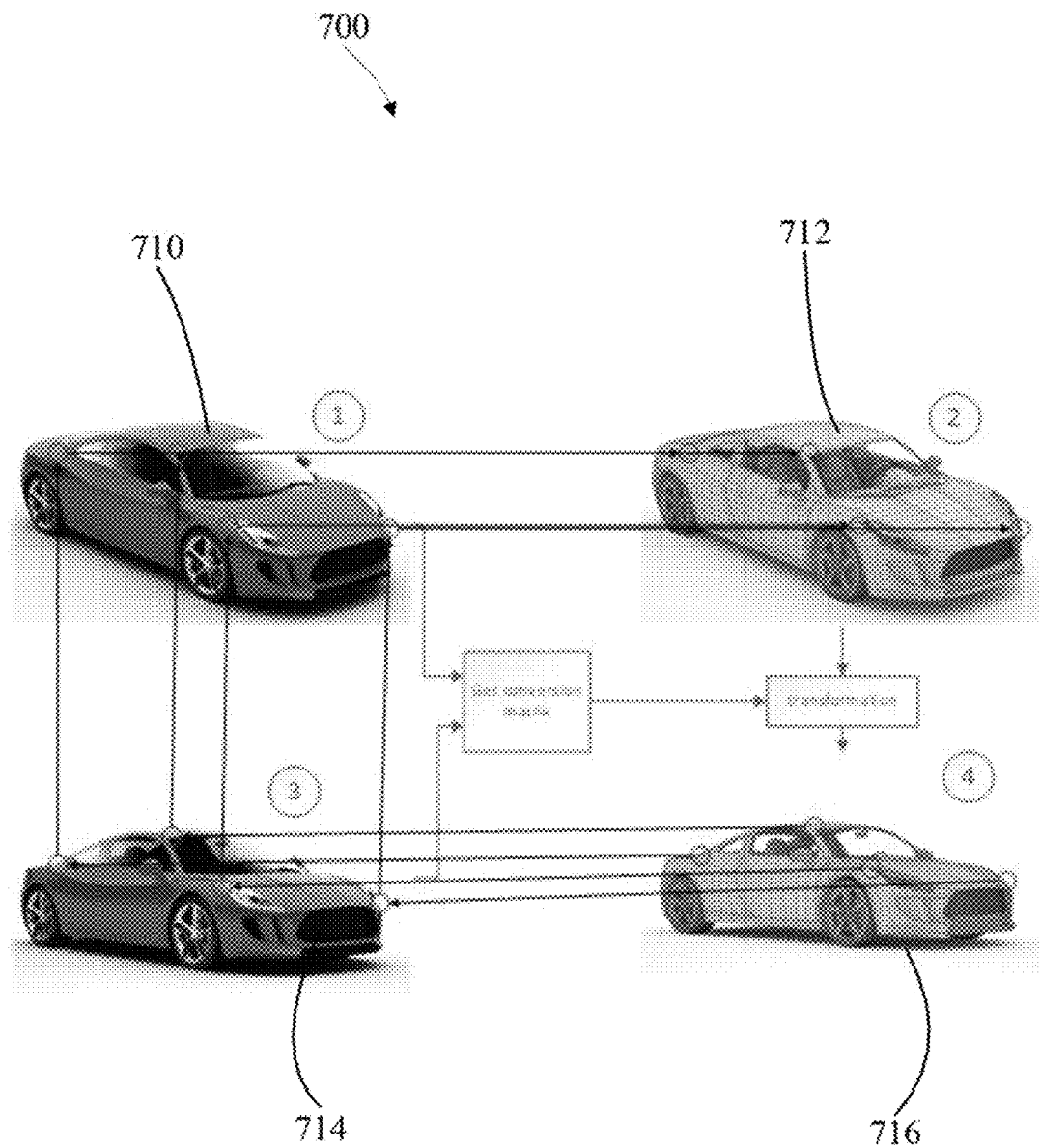
FIG. 7 depicts an entrance to movement conversion and transform in accordance with one embodiment of the disclosure.
Figure 8:
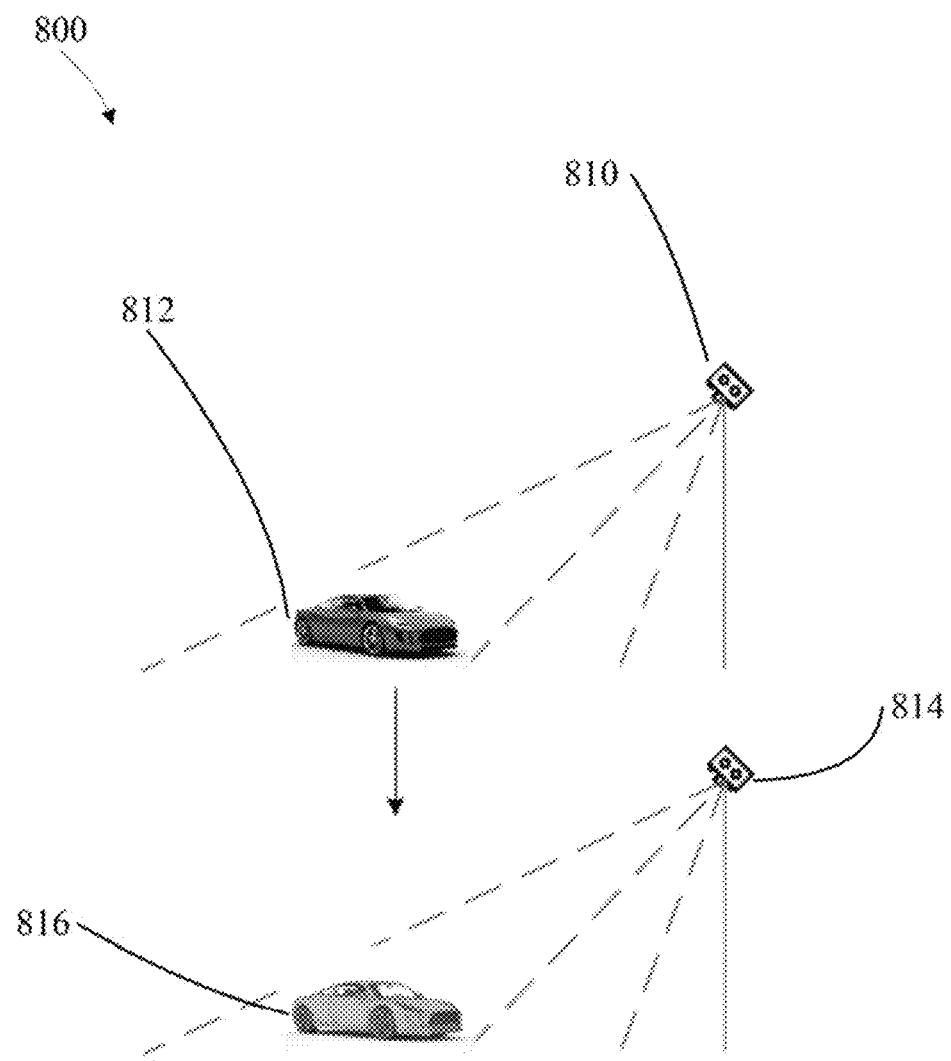
FIG. 8 depicts an image to model tracking within the parking lot in accordance with one embodiment of the disclosure.

FIG. 7 demonstrates an example process, the template image 710 is captured by an entry stereo camera and the 3D structure 712 is matched to the template image. A parkway image 714 is captured by a parkway camera in the parking lot. The parkway image 714 and the template image 710 have some differences because they are captured by different cameras and their view angles are different. The parkway image 714 and the template image 710 are matched to provide a transformation matrix to transform the view angle of the template image 710 to the view angle of the parkway image 714. This transformation matrix is utilized to convert the 3D structure 712 to view angle of the parkway image 714 to get the transformed image 716. Because the template image 710, 3D structure 712 and parkway image 714 are high resolution, the transformed image 716 may be high precision also. This transformation allows determination of the position and occupied space 812, 816 of the car as shown in FIG. 8 and provided by cameras 810, 814.

Figure 9:
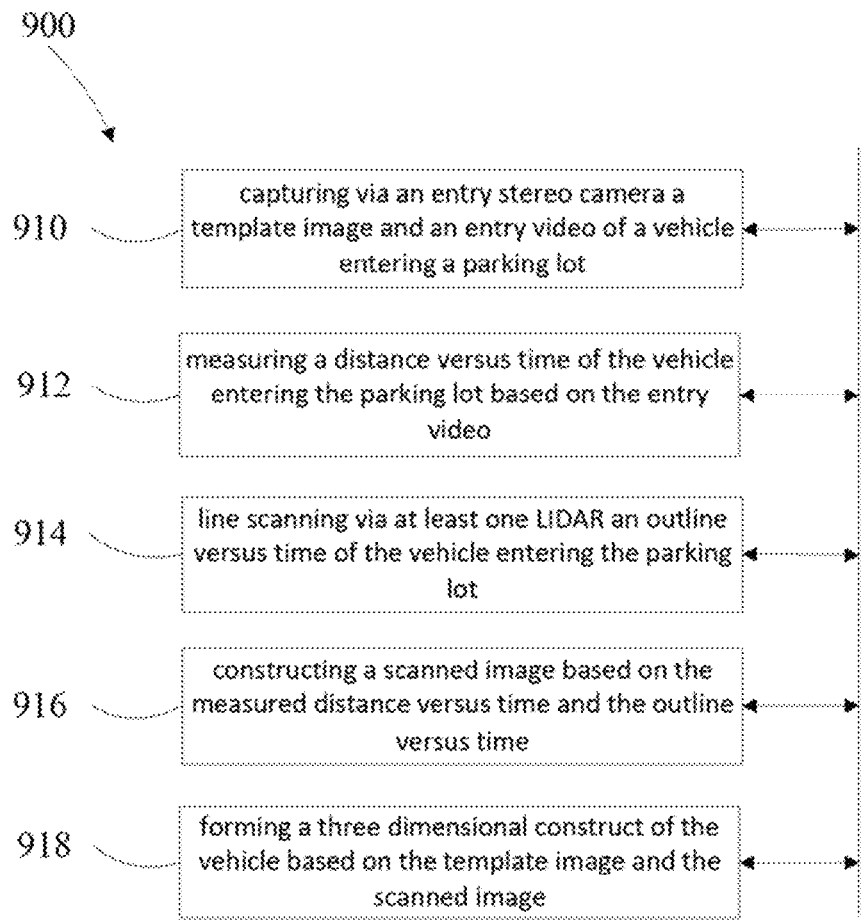
FIG. 9 is a first example flow diagram of precision location of an object in accordance with one embodiment of the disclosure.

FIG. 9 depicts an example method of high precision object location in a parking lot including capturing 910 via an entry stereo camera, a template image and an entry video of a vehicle entering a parking lot. The method then measures 912 a distance versus time of the vehicle entering the parking lot based on the entry video and line scans 914 via at least one LIDAR an outline versus time of the vehicle entering the parking lot. The method then constructs 916 a scanned image based on the measured distance versus time and the outline versus time and forms 918 a three dimensional construct of the vehicle based on the template image and the scanned image. The template image and 3D construct are utilized to construct a transformed image and the precision localization of the vehicle in the parking lot may be determined.

Figure 10:
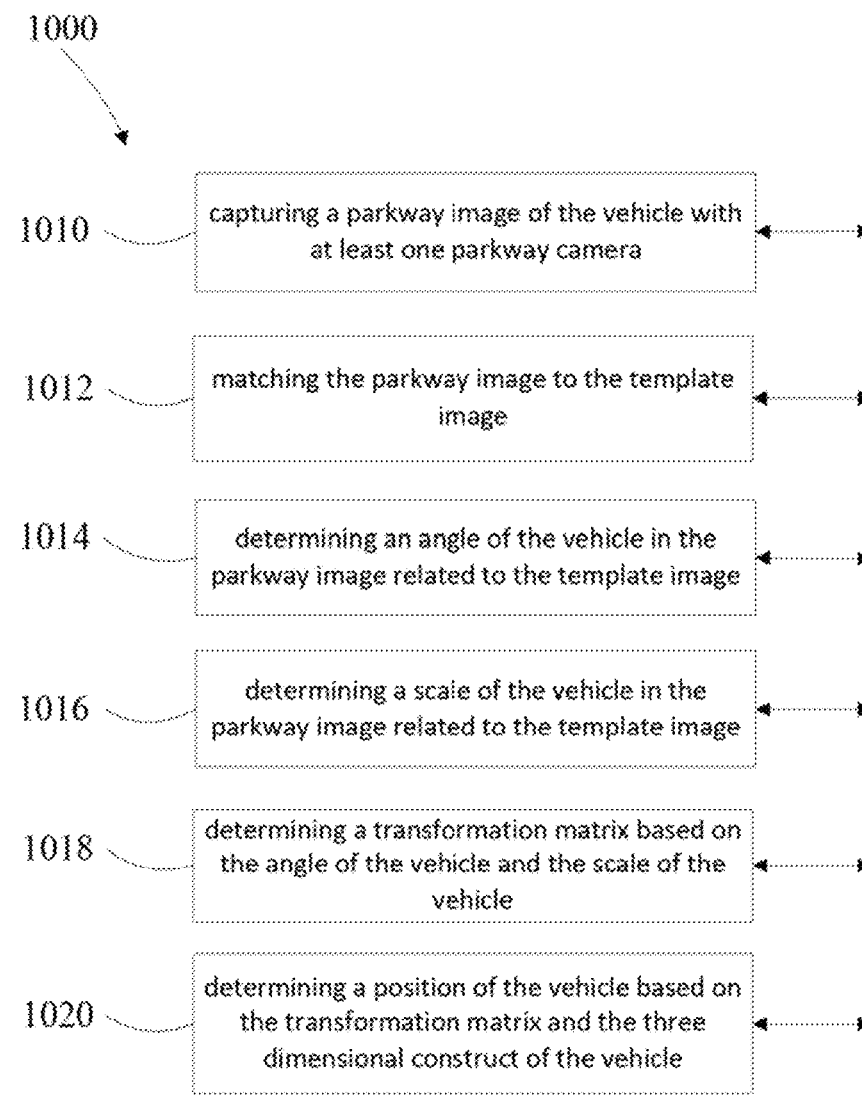
FIG. 10 is a second example flow diagram of precision location of an object in accordance with one embodiment of the disclosure.

FIG. 10 depicts a second portion of the example method that further includes capturing 1010 a parkway image of the vehicle with at least one parkway camera and matching 1012 the parkway image to the template image. Based on the differences between the template image and the parkway image the method further determines 1014 an angle of the vehicle in the parkway image related to the template image and determines 1016 a scale of the vehicle in the parkway image related to the template image. The method then determines 1018 a transformation matrix based on the angle of the vehicle and the scale of the vehicle and determines 1020 a position of the vehicle based on the transformation matrix and the three dimensional construct of the vehicle.

Communication of the vehicle position within the parking lot may be accomplished by one of several means, the location data may be communicated directly to the advanced driving system (ADS), to the global positioning system (GPS) or the like.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, hut rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "example" is used herein to mean "serving as an example or illustration," Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have." or the like is used in the description or the claims, such term is intended to be inclusive in a manner similar to the term "comprise" as "comprise" is interpreted when employed as a transitional word in a claim.

References to "one embodiment," "an embodiment," "some embodiments," "various embodiments", or the like indicate that a particular element or characteristic is included in at least one embodiment of the invention. Although the phrases may appear in various places, the phrases do not necessarily refer to the same embodiment. In conjunction with the present disclosure, those skilled in the art will be able to design and incorporate any one of the variety of mechanisms suitable for accomplishing the above described functionalities.

It is to be understood that the disclosure teaches just one example of the illustrative embodiment and that many variations of the invention can easily be devised by those skilled in the art after reading this disclosure and that the scope of then present invention is to be determined by the following claims.

What is claimed is:

1. A method of high precision object location in a parking lot, comprising:
    capturing via an entry stereo camera a template image and an entry video of a vehicle entering the parking lot;
    measuring a distance versus time of the vehicle entering the parking lot based on the entry video;
    line scanning via at least one LIDAR an outline versus time of the vehicle entering the parking lot, wherein the outline is a 3D model of the vehicle;
    constructing a scanned image based on the measured distance versus time and the outline versus time;
    matching the scanned image from the at least one LIDAR to the template image from the entry stereo camera; and
    forming a three dimensional construct of the vehicle based on the matched template image and the scanned image, wherein the template image and the three dimensional construct is utilized for vehicle localization that is communicated directly to a vehicle advanced driving system.

2. The method of claim 1, wherein the line scanning is performed to capture the outline of a top of the vehicle and at least one side of the vehicle.

3. The method of claim 1, wherein the line scanning is performed utilizing at least two LIDARs.

4. The method of claim 1, further comprising:
capturing a parkway image of the vehicle with at least one parkway camera;
matching the parkway image to the template image;
determining an angle of the vehicle in the parkway image related to the template image;
determining a scale of the vehicle in the parkway image related to the template image;
determining a transformation matrix based on the angle of the vehicle and the scale of the vehicle; and
determining a position of the vehicle based on the transformation matrix and the three dimensional construct of the vehicle.

5. The method of claim 4, wherein the at least one parkway camera is a stereo camera.

6. The method of claim 4, wherein the at least one parkway camera is a mono camera.

7. The method of claim 4, wherein the at least one parkway camera is a plurality of parkway cameras forming an array.

8. The method of claim 7, wherein the at least two LIDARs are positioned to a right side and a left side of a vehicle path of travel as the vehicle enters the parking lot.

9. A system of high precision object location in a parking lot, comprising:
an entry stereo camera that captures a template image and an entry video of a vehicle entering the parking lot;
at least one LIDAR line that scans an outline versus time of the vehicle entering the parking lot, wherein the outline is a 3D model of the vehicle;
a non-transitory computer readable medium comprising instructions that, when read by a processor, cause the processor to:
measure a distance versus time of the vehicle entering the parking lot based on the entry video;
construct a scanned image based on the measured distance versus time and the outline versus time;
match the scanned image from the at least one LIDAR to the template image from the entry stereo camera; and
form a three dimensional construct of the vehicle based on the matched template image and the scanned image, wherein the template image and the three dimensional construct is utilized for vehicle localization that is communicated directly to a vehicle advanced driving system.

10. The system of claim 9, wherein the at least one LIDAR is positioned to capture the outline of a top of the vehicle and at least one side of the vehicle.

11. The system of claim 10, wherein the at least two LIDARs are positioned to a right side and a left side of a vehicle path of travel as the vehicle enters the parking lot.

12. The system of claim 9, further comprising:
at least one parkway camera that captures a parkway image of the vehicle;
the non-transitory computer readable medium comprising instructions that, when read by the processor, cause the processor to further;
match the parkway image to the template image;
determine an angle of the vehicle related to the template image;
determine a scale of the vehicle related to the template image;
determine a transformation matrix based on the angle of the vehicle and the scale of the vehicle; and
determine a position of the vehicle based on the transformation matrix and the three dimensional construct of the vehicle.

13. The system of claim 12, wherein the at least one parkway camera is a stereo camera.

14. The system of claim 12, wherein the at least one parkway camera is a mono camera.

15. The system of claim 12, wherein the at least one parkway camera is a plurality of parkway cameras forming an array.

16. The system of claim 15, wherein the at least two LIDARs are positioned to a right side and a left side of a vehicle path of travel as the vehicle enters the parking lot.

* * * * *